May 7, 1968
R. J. YUNGHAHN
3,381,391
APPARATUS FOR THE DRYING OR COOLING OF HOLLOW
CONTAINERS WHILE IN TRANSPORT
Filed Nov. 16, 1966
5 Sheets-Sheet 3
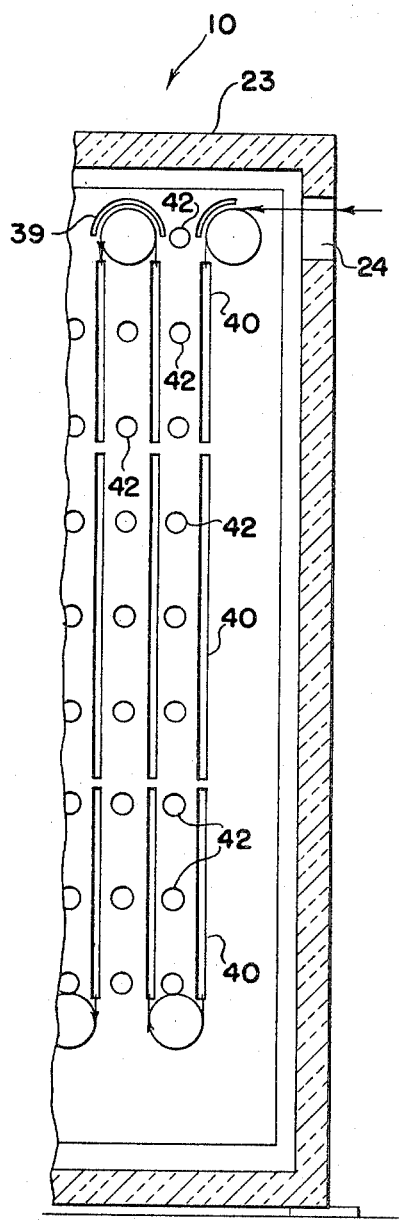
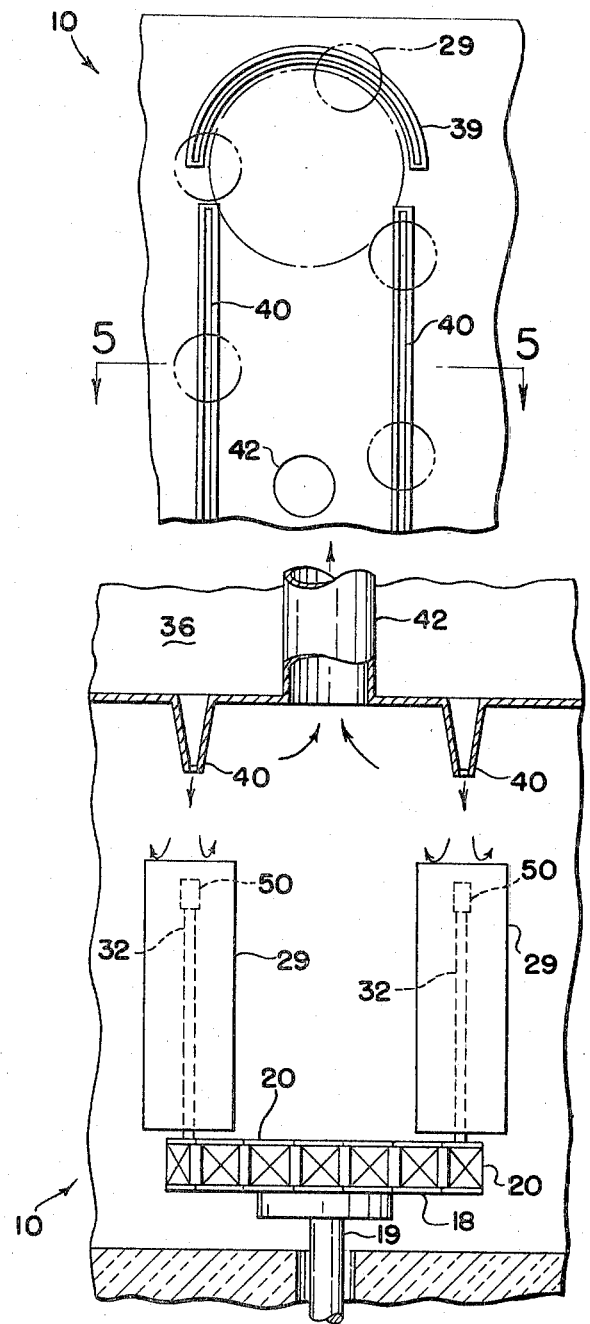
INVENTOR.
RICHARD J. YUNGHAHN
BY
Thomas S. Mayner
ATTORNEY May 7, 1968 R. J. YUNGHAHN 3,381,391
APPARATUS FOR THE DRYING OR COOLING OF HOLLOW
CONTAINERS WHILE IN TRANSPORT
Filed Nov. 16, 1966 5 Sheets-Sheet 4
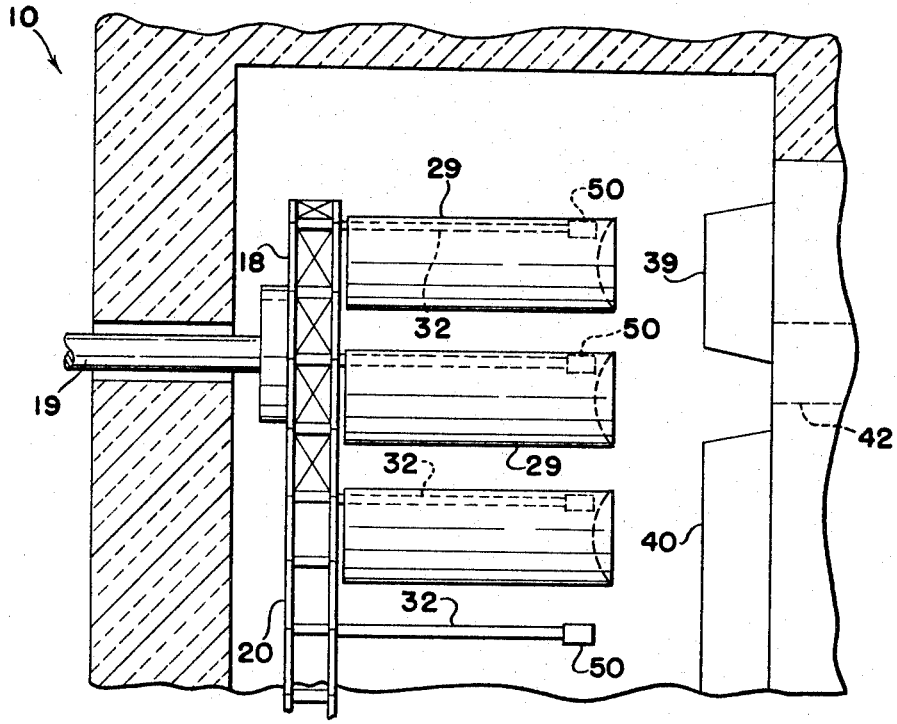
FIG. 6
FIG. 7
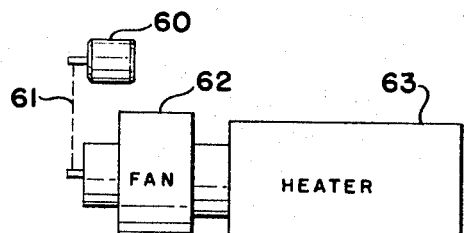
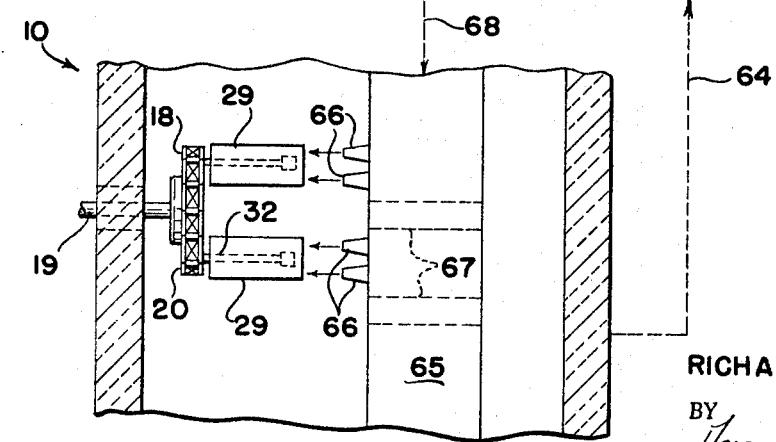
INVENTOR.
RICHARD J. YUNGHAHN
BY
ATTORNEY May 7, 1968  R. J. YUNGHAHN  3,381,391
APPARATUS FOR THE DRYING OR COOLING OF HOLLOW
CONTAINERS WHILE IN TRANSPORT
Filed Nov. 16, 1966  5 Sheets-Sheet 5
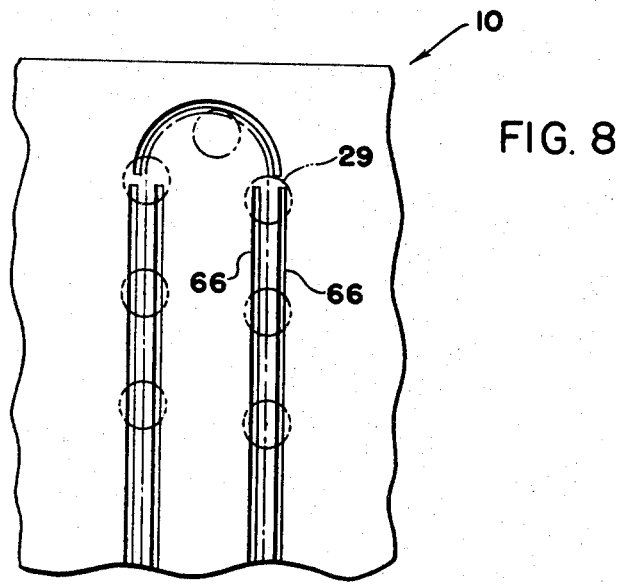
FIG. 8
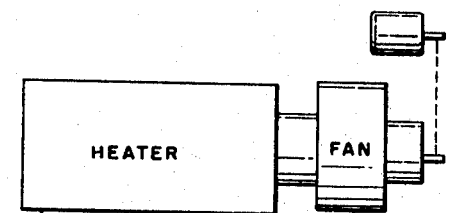
FIG. 9
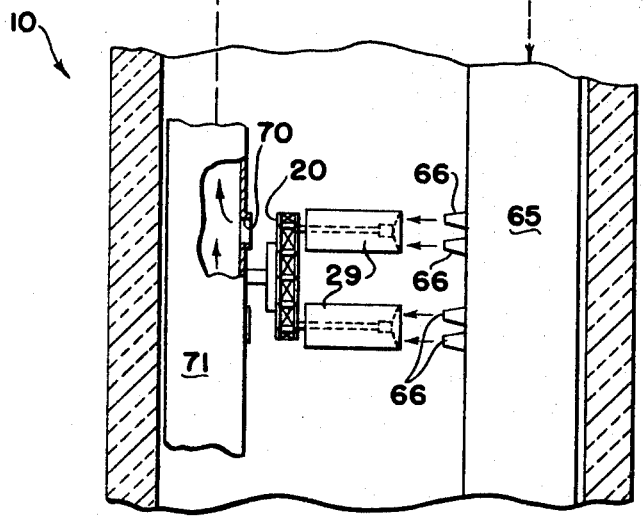
INVENTOR.
RICHARD J. YUNGHAHN
BY
Thomas S. Mayner
ATTORNEY

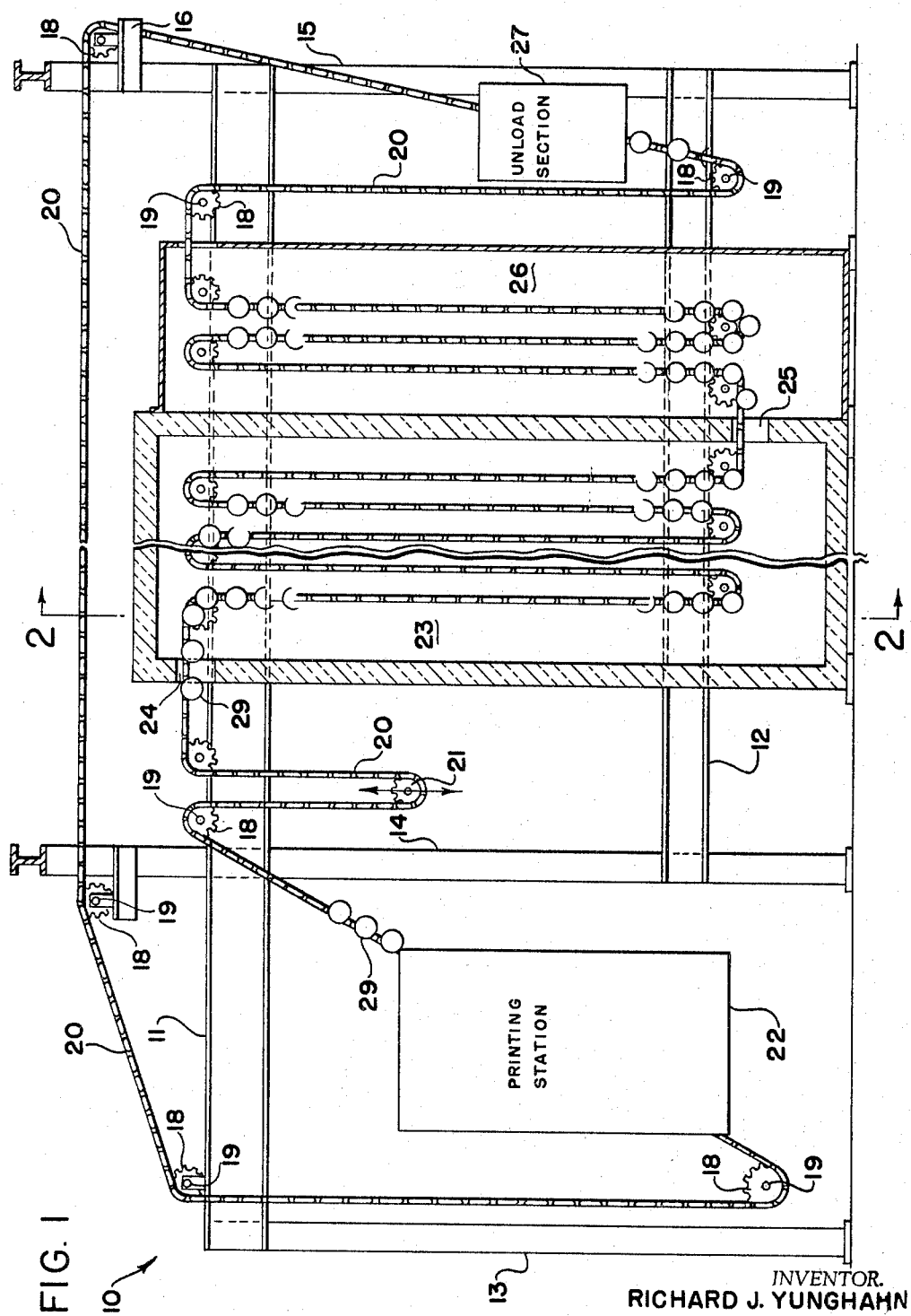

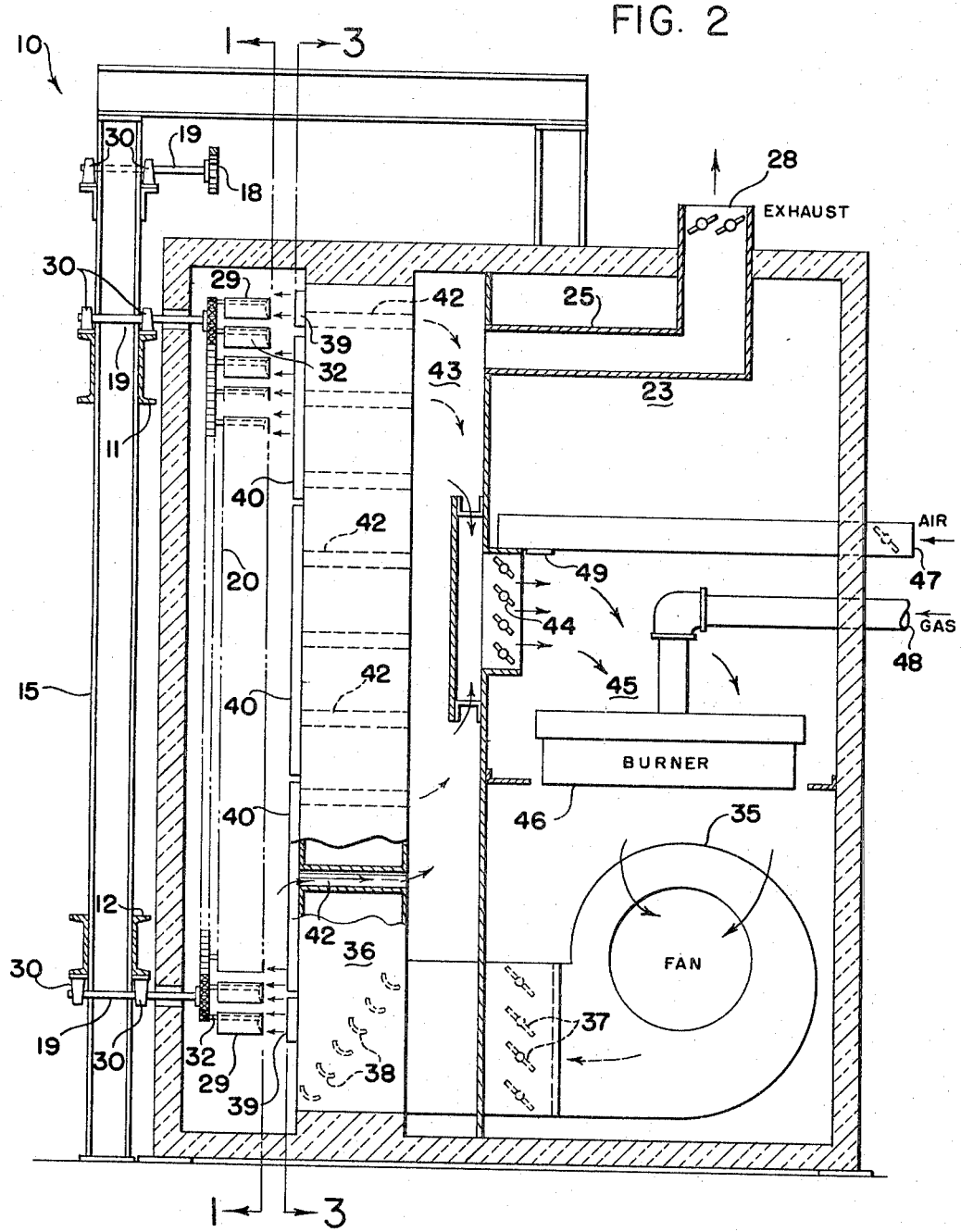

United States Patent Office 3,381,391
Patented May 7, 1968

3,381,391
APPARATUS FOR THE DRYING OR COOLING OF HOLLOW CONTAINERS WHILE IN TRANSPORT
Richard J. Yunghahn, Bernardsville, N.J., assignor to Midland-Ross Corporation, Cleveland, Ohio, a corporation of Ohio
Continuation-in-part of application Ser. No. 363,261, Apr. 28, 1964. This application Nov. 16, 1966, Ser. No. 607,098
2 Claims. (Cl. 34—105)

ABSTRACT OF THE DISCLOSURE

Previously treated cylindrical containers having one end closed are placed on an endless chain-link conveyer having pegs mounted thereon perpendicular to its longitudinal axis. The link conveyer passes through a drying or treating zone in several vertical loops then through a cooling zone. During the conveyer's travel through the treatment zone the containers, placed on the pegs through the open end of each, are subjected to a continuous stream of heated air (gas) directed at the closed end and over the sides axially of the containers, drying the applied treatment and meanwhile assisting in maintaining them on the pegs.

---

This is a continuation-in-part application of an original application having Ser. No. 363,261, filed Apr. 28, 1964 and now abandoned.

This invention relates to an apparatus for the gaseous treatment in processes such as drying, annealing, oxidizing or cooling, etc. of hollow containers during their transport through a gas treating zone.

In general, hollow containers to which an outer coating of lacquer, enamel, and labeling has been applied or metal containers annealed while being carried through such treatment on a conveyer require an apparatus that will securely hold such articles in position in a manner exposing the entire surface for quick and total drying or cooling of them after such applications. Again, in general, such conveyers may be endless metal belts, endless chains, worms, with additional means for mounting, and sometimes rotating each mounted and supported individual container as it is carried through a drying or cooling zone where they are subjected to sweeping hot or cool gases at substantial velocities. The subjection of the containers to the gases under pressure spreads whatever coating material has been applied providing for an even and quick dried coat, or fixes an applied label, or cools them for further handling. In continuous production and manufacture, there is need for a quick treatment, whether cooling and drying of applied paints, enamels, oxides, or lacquers used in coating or labeling and this can be attainable by a proper use of gaseous matter directed in an advantageous manner.

The apparatus arrangement advantageously obviates additional container supporting means generally utilized with conveyers. The gases are used to effect setting or fixing or drying of the applied material on the containers and position and maintain the containers on the endless conveyer. The simultaneous double utilization of the treating gases thus advantageously eliminates the need for any additional holding or supporting means that would be normally required for holding the cans on a conveyer while passing through a gas treating zone.

The apparatus will be illustrated and described more specifically hereafter in connection with the accompanying drawings, where:

FIGURE 1 represents, in diagrammatic form, a side elevation of an apparatus utilizing the structure of the invention;

FIGURE 2 is a diagrammatic representation of the treating zone or chamber of FIGURE 1, the view being across lines 2—2 showing the position of the gas outlet nozzles and exhausts and their positions relative to the hollow containers;

FIGURE 3 is another view of the outlet and exhaust sections of the manifold of FIGURE 2 across lines 3—3 thereof;

FIGURES 4 and 5 are details of the manifold nozzles and exhausts;

FIGURE 6 represents the ease of mounting and maintaining treated hollow containers on a conveyer while going through the gas drying zone;

FIGURE 7 shows, in a top view, a modified arrangement of the manifold's outlet and exhausts for the treating gases;

FIGURE 8 represents, in greater detail, a front view of a modification of FIGURE 7; and FIGURE 9 is representative of a further modification where the outlet manifold is on one side and the exhaust is on the other side of the traveling conveyer mounting the hollow containers.

Referring to FIGURE 1, a representative layout of an apparatus 10 of this invention comprises a supporting framework which includes horizontal members 11 and 12 positioned in spaced vertical relation relative each other secured to vertical supporting members 13, 14 and 15. The horizontal members 11 and 12 plus frame extension 16 in turn support endless chain gears 18 rotating about pins or shafts 19 and, carrying thereover in a continuous manner, an endless chain 20. Means for rotating the chain (not shown herein) can be positioned where most advantageously desired. Tension in the conveyer 20 is regulated by the floating gear roll 21.

Within the framework of the apparatus 10, there are arranged several stations 22, 23, 26, 27. The first is the printing or coating station 22, where metallic cans or others are loaded onto the endless belt after being spray coated or labeled. The endless chain then proceeds into an intermediate chamber 23 entering through openings 24 and therefrom through outlet opening 25, and in which chamber the printed or coated cans are subjected to a gaseous drying, coating and fixing treatment. After such treatment, the cans are permitted to cool off and further dried in adjacent chamber 26, then they are unloaded in this area or zone 27.

This invention will deal primarily with the processing of the containers in chamber 23 wherein the containers 29 are subjected to a sweeping gas treatment to effect drying, fixing or removal of excess applied treatment while simultaneously firmly maintaining the containers on the conveyer 20. As shown in FIGURE 2, the endless conveyer 20 with the treatment applied empty containers 29 traverses the compartment 23 through several vertical paths, the longitudinal axis of the containers being at a 90° angle thereto facing the gas nozzles or outlet manifolds 39, 40. The endless chain 20 moves over the gears 18 mounted for rotation on shafts 19 rotating in fixed spaced bearings 30 mounted on the supporting frame structures 11, 12. As the chain moves vertically up or down, gas, in a jet form, issues at predetermined velocities from adjacent facing openings or nozzles 39 and 40 against the container 29 ends impinging thereon and sweeping over their surfaces. By directly directing the gaseous current onto the containers, they are pushed and maintained on their support rods 32, being firmly positioned thereon through their entire period of travel and the rods are desirably spaced to prevent any contact between the mounted containers as well as to permit a total circumferential sweep by the drying gases.

The container mounting rods 32 are positioned perpendicularly to the endless chain and so maintained without any change in angularity throughout the travel of the chain through the apparatus. This provides for a more economic operation since otherwise they would have to be angled in a vertical direction to prevent the cans from vibrating off when subjected to a gaseous impingement. Angled positioning would entail increased wear and tear on the endless chain and its bearings.

The chamber 23 is, of course, substantially airtight to provide for an economic operation of the unit. The gas emanating from the nozzles 39, 40 is exhausted through a plurality of spaced intermediate exhausts 42 positioned within the body of the same manifold 36. The gas circulation through the treating chamber 23 is as follows: External air, where needed, is taken in through conduit 47 having regulating controls therein, then admitted into an area 45 through opening 49 in the conduit. New air is admixed with recirculating gas from the drying chamber being admitted through a controlled wall opening 44 thence into the common chamber 45 and, as admixed air or gas, passed through the heater or burner 46 into the fan 35 chamber. Depending on the type of treatment affected, not all returned or used gases can be utilized, some may contain solvents or other matter and need be exhausted. Such undesirable used gas is exhausted through conduit 25, its inlet in manifold 43, and through control damper 28 therein. The circulating fan 35 then forces the heated gases through controls 37 and baffles 38 into manifold member 36. The manifold 36 runs in a vertical direction equivalent to a distance sufficient to cover the vertical lengths of the endless chain 20 carrying the containers 29.

As shown (see also FIGURES 3 and 4), the manifold 36 has rectangular, narrow nozzles 40 and curvilinear nozzles 39. Nozzles 39 are arcuate so as to cover the containers 29 at the turns of the endless chain 20 while the narrow, longitudinal type nozzles 40 face the containers on the conveyer straightaways. Also, positioned within the manifold 36 are the gas return exhausts 42. The gas exhausts 42 are adapted to return the gas or air from the treating chamber 23 to the rear exhaust manifold 43 then through the controlled manifold opening 44 into the admixing chamber 45 and then to the heater or burner 46. Gas to the heater or burner 46 is provided through a conduit 48.

The outlet nozzles 39, 40 are more specifically shown in FIGURES 3, 4 and 5, as well as the gas or air exhausts 42. As shown, the lengths of the nozzles 39, 40 are designed to substantially continuously cover the containers 29 while on the endless chain 20. The exhausts 42 are interspersed and in number to provide for desired velocities and quick removal of the gases from that part of the chamber 23 where the containers are subjected to a drying or fixing treatment. Since the conveyer movement is generally fairly rapid, the nozzles 39, 40 are arranged in a covering manner over its entire path in the chamber, the gas blast continually impinging on the container end surfaces across their diameters and over their outer peripheries to maintain them securely on their supporting arbors especially when reversing their direction at the ends. The containers 29 in FIGURE 4 are shown in dotted line and in their position of travel while facing the nozzles 39 and 40. Again, in FIGURE 5, gas issuing from nozzles 40 is shown directed onto the containers 29, some being immediately deflected into the exhausts 42 and a greater portion of it sweeping their periphery, being exhausted through the intermediately positioned exhausts 42. The containers will position themselves in generally a firm manner, while being subjected to the gaseous blast, about their arbors 32 as they are carried throughout the chamber.

The containers may have flat bottoms as in FIGURE 5 or indented bottoms as in FIGURE 6. Also, the mounting pin or support 32 can have an enlarged terminal portion 50. The enlarged portion is desirably of softer material so that the containers are not damaged while being positioned by a gaseous blast. In FIGURE 6, where the container ends are indented, gas issuing from the nozzles 39 and 40 impinges directly on the container ends more forcefully than on flat ends forcing them rearwardly and more securely on the supporting arbors 32. The enlarged ends 50 on supporting arbors 32 effect a downward sag of the container at the opposite end or the open end to additionally assist in maintaining the container on the arbors 32 should the gases be cut off or when traveling through the remaining chambers.

A modification of the method of this invention is shown in FIGURES 7 and 8 and it consists of dividing the previously single nozzles 39 and 40 into two. As shown, the gas manifold 65 carrying the treating gases has a pair of side-by-side, or parallel, nozzles 66, the twin streams impinge the container ends 29 at about their sides, thus more thoroughly enveloping and sweeping them to more quickly remove or dry a coating. The gases are then returned through an exhaust 67 positioned on the same side and returned through a conduit 64 (diagrammatically shown) back to the heater 63 thence to the fan 62, driven by a motor 60, and then through an intervening connection 61. The gases from the fan are led to the manifold 65 through a conduit 68. This forms a complete circulating system utilizing already heated gas which is advantageously reused. The split nozzles are shown in further tail in FIGURE 8 and advantageously can run the length detail in FIGURE 8 and advantageously can run the length of the manifold or occasionally split along their length as desired.

A further modification to the method of FIGURE 7 wherein the gaseous streams are split is shown in FIGURE 9. The gases emanating from the split issuing nozzles 66, after sweeping the containers 29, carried on endless chain 20, are returned on the opposite wall having a vertical return manifold 71, the gases being exhausted thereinto and through openings 70 positioned substantially directly back of the endless chain.

The advantages of the apparatus for drying and simultaneously supporting containers on an endless chain while traveling through a gas subjected treating station have been herein described and it is to be understood that the applicant includes all other modifications except as indicated by the claims hereto appended.

What is claimed is:

1. In an apparatus for handling previously treated hollow containers having one open end, a gas treating zone through which said containers continuously pass, an endless conveyer mounting said containers and being adapted to pass through said treating zone, means in said zone for supporting and leading said conveyer in a plurality of spaced vertical paths through the zone, pin-like support means for said containers being mounted thereon generally perpendicularly thereto and being spaced from each other to avoid contact between said containers, vertically positioned longitudinally extending gas inlet nozzles positioned opposite and in the direction of said conveyer, said containers being mounted on said pin-like supports in a suspended manner through the open ends, exhaust passages opposite said inlet nozzles, said inlet nozzles directing gases horizontally onto said containers over their closed ends and exteriors in the direction of their longitudinal axes, and a following cooling chamber through which said containers are next passed.

2. In an apparatus for handling previously treated hollow cylindrical containers having one open end, a gas treating enclosed zone except for openings through which said containers continuously pass, an endless conveyer mounting said containers and being adapted to pass through said treating zone, means in said zone for supporting and leading said conveyer in a plurality of spaced vertically oriented paths through the zone, pin-like support means for said containers being mounted thereon generally perpendicularly thereto so as to provide horizontal support and being spaced from each other to avoid contact between said containers, said containers being mounted on said pin-like supports resting on their sides in a suspended manner through the open ends, longitudinally vertically and inwardly extending gas inlet nozzles positioned in said zone opposite to and facing in the direction of the conveyer for directly blowing treating gases at said containers, horizontally positioned exhaust passages in the enclosed zone adjacent and between said inlet nozzles for continually evacuating it, and said inlet nozzles by directing gases onto and about said containers in the direction of their horizontal longitudinal axes assist in maintaining them on their mounts while being treated.

References Cited

UNITED STATES PATENTS

| | | | |
|---|---|---|---|
| 579,392 | 3/1897 | Smith et al. | 34—105 |
| 1,839,628 | 1/1932 | Williams | 34—105 |
| 2,295,475 | 4/1950 | Mariani | 34—207 X |
| 2,599,721 | 6/1952 | Remington et al. | 34—216 X |
| 3,089,254 | 5/1963 | Johnson et al. | 34—105 X |

FREDERICK L. MATTESON, JR., *Primary Examiner.*

A. D. HERRMANN, *Assistant Examiner.*